UNITED STATES PATENT OFFICE.

FREDERICK W. WOOD, OF BALTIMORE, MARYLAND.

METHOD OF TREATING ORES.

1,334,981. Specification of Letters Patent. Patented Mar. 30, 1920.

No Drawing. Application filed June 24, 1914, Serial No. 846,914. Renewed July 28, 1919. Serial No. 313,826.

*To all whom it may concern:*

Be it known that I, FREDERICK W. WOOD, a citizen of the United States, residing at Baltimore, in the State of Maryland, have invented certain new and useful Improvements in Methods of Treating Ores, of which the following is a specification.

This invention relates to a method of treating plastic ores, more particularly iron ores, to enable the same to be economically and practicably handled and smelted.

In a certain locality, large deposits of ore occur, consisting of hydrated sesquioxid of iron, intimately mixed with alumina and silica, the alumina being in excess of 8%, also small portions of other mineral substances, all of these constituents being in a state of extreme subdivision. The undisturbed ore is of the consistency of firm clay, and contains in addition to the above substances, a large proportion of absorbed or hygroscopic water, the average percentage being approximately 24% to 28%. Owing to the fact that when dry, the ore becomes mainly an exceedingly fine powder, which in the blast furnace is carried away by the rapidly moving currents of gas, it has not been feasible to smelt the ore in the furnace in its natural state, and resort has been had to preliminary treatment of the ore in rotary kilns at a sufficiently high temperature to cause incipient fusion or sintering, thereby causing the fine particles to agglomerate into nodules or pellets. It has been feasible, with the ore in this agglomerated form to successfully subject it in the blast furnace to the usual and ordinary process of smelting generally employed in the manufacture of pig iron. To avoid the expense, incident to the nodulizing process, for fuel and manipulation, attempts have been made to form the ore in its natural condition, as mined, into briquets or other compact bodies of sufficient strength to withstand the necessary handling, and of sufficient size to resist the lifting influence of the upward currents of gases in the blast furnace. But these attempts have not been entirely successful, because of the strong adhesion of the plastic mass to the surfaces of the dies, molds, rolls and other molding devices; the tenacity with which the mined ore retains the absorbed water, even after the ore is exposed to the air, causing the material to retain its plastic clay-like condition for a considerable period. Further, owing to the high percentage of absorbed water contained in the ore in its natural state, such bricks or briquets as can be made, have not been found strong enough as they come from the molds, to withstand the handling and abrasion in the several operations of charging the furnace and smelting, without excessive breakage and the formation of fine material.

I have found by a series of experiments, that if the amount of absorbed or hygroscopic water in the ore is adjusted to a certain point, either by adding water to bring the amount up to the desired point, or by partially drying the ore to reduce the amount to the desired point, there will not be such tendency of the ore to adhere to metal surfaces as will prevent the ore from being formed by means of suitable compressing or molding apparatus into briquets or like bodies of sufficient strength to withstand subsequent handling in charging into the blast furnace, and the operation of smelting, with very small, if any, loss in dust. The amount of hygroscopic water which I have found that the ore may possess in order to be handled in this manner, is from between 14% and 20%, and my invention therefore comprehends a method of treatment of the ore, consisting in adjusting its content of hygroscopic or combined water to between 14% and 20% or thereabout. In its more specific aspect my invention consists of a method of treatment of the ore, in which the ore is partially dried to reduce its content of hygroscopic water; and further my invention consists in a method of treatment consisting in adjusting the content of hygroscopic water to the proper amount, and then compressing or molding the treated ore under heavy pressure in the form of bricks, briquets and like bodies.

In treating plastic ore which contains substantially the amount of hygroscopic water occurring in the natural condition of the ore, and as it is mined, that is approximately between 24% and 28%, in order to enable the ore to be compressed or molded into briquets and the like, I subject a quantity of the ore to a partial drying action in any suitable manner and by the aid of suitable and appropriate apparatus, and by this means I reduce the water content of the ore until it contains from 14% to 20%, preferably 18% of hygroscopic water. In this condition, and while still plastic, the amount of hygroscopic water is not sufficient to cause the ore to adhere strongly to the metal surfaces of rolls, dies, molds or like forming or compressing apparatus, the result being that the treated ore can be readily formed or molded under heavy pressure into bricks, briquets or like bodies of sufficient size and strength to adapt them to be subsequently handled in charging into the blast furnace, and in the smelting operation. If from any cause the amount of hygroscopic water has been reduced below 14% say, I bring the total hygroscopic content up to the desired point, by adding sufficient water thereto, and in this manner adjust the content to the proper point for enabling the ore to be successfully compressed or molded into briquets.

The treated ore in its plastic condition containing the proper amount of hygroscopic water may be formed or molded into briquets or similar bodies by suitable compressing apparatus which in itself forms no part of the present invention, and therefore will not be herein described.

The briquets as discharged from the molding cavities, while still damp, possess a degree of toughness which renders them less liable to breakage and the formation of fine dust in handling, than if the hygroscopic water is more completely removed. By charging the briquets in the damp condition into the smelting furnace, they have time to descend therein and become covered by the successive layers of fuel, flux and ore, before becoming dry. Consequently, the liability of the removal of fine particles in the form of dust from their surfaces, by the contact with the other materials making up the charge is reduced.

Having thus described my invention, what I claim is:

1. The method of treating plastic ore containing in its natural state hygroscopic water, preparatory to compressing the same into briquets and like bodies, which consists in adjusting the content of hygroscopic water to between 14% and 20% or thereabout to prevent the ore from adhering strongly to the compressing surfaces.

2. The method of treating plastic ore containing in its natural state hygroscopic water, preparatory to forming said ore into briquets, which method consists in subjecting the ore to a drying action to reduce its content of hygroscopic water sufficiently to prevent the ore from adhering strongly to the briqueting surfaces.

3. The method of treating plastic ore containing in its natural state a large proportion of hygroscopic water, preliminary to forming said ore into briquets and like bodies, which method consists in subjecting the ore to a drying action to reduce said content of hygroscopic water sufficiently to prevent the ore from adhering strongly to the forming surfaces.

4. The method of treating plastic ore containing in its natural state hygroscopic water in the proportion of from 24% to 28% or thereabout, which consists in subjecting said ore to a drying action sufficient to reduce its content of hygroscopic water to from 14% to 20% or thereabout to facilitate the subsequent handling of the ore.

5. The method of treating plastic ore containing in its natural state hygroscopic water, which consists in subjecting said ore to a drying action to reduce its content of hygroscopic water sufficiently to facilitate the subsequent briqueting of the ore, and then forming said treated ore into briquets or like bodies.

6. The method of treating plastic ore containing in its natural state hygroscopic water in the proportion of from 24% to 28% or thereabout, which consists in subjecting said ore to a drying action sufficient to reduce its content of hygroscopic water to from 14% to 20% or thereabout, and then forming said treated ore into briquets or like bodies.

7. The method of treating plastic ore containing 8% or more of alumina, which consists in adjusting the hygroscopic water content to between 14% and 20%, subjecting the treated ore to heavy pressure to form the same into briquets and like bodies, and charging said briquets into a smelting furnace.

In testimony whereof I have affixed my signature in presence of two witnesses.

FREDERICK W. WOOD.

Witnesses:
A. G. BUTLER,
H. I. NEWLIN.